United States Patent [19]

Mayer

[11] Patent Number: 5,003,914

[45] Date of Patent: Apr. 2, 1991

[54] INDICATING INSTRUMENT

[75] Inventor: Klaus Mayer, Obertshausen, Fed. Rep. of Germany

[73] Assignee: VDO Adolf Schindling AG, Frankfurt am Main, Fed. Rep. of Germany

[21] Appl. No.: 492,376

[22] Filed: Mar. 8, 1990

Related U.S. Application Data

[63] Continuation of Ser. No. 287,474, Dec. 19, 1988, abandoned.

[30] Foreign Application Priority Data

Dec. 24, 1987 [DE] Fed. Rep. of Germany ... 8716940[U]
Feb. 11, 1988 [DE] Fed. Rep. of Germany ....... 3804144
Aug. 27, 1988 [DE] Fed. Rep. of Germany ....... 3829080

[51] Int. Cl.[5] .......... G01D 13/22

[52] U.S. Cl. .......... 116/332; 116/288; 116/328

[58] Field of Search .......... 116/327, 286, 287, 288; 368/228, 80

[56] References Cited

U.S. PATENT DOCUMENTS 1,840,039 1/1932 Joyce .......... 116/328
2,946,006 7/1960 Huzar .......... 116/332
2,957,447 10/1960 Pearce .......... 116/332
3,130,705 4/1964 Inham .......... 116/328
3,142,148 7/1964 Morgan et al. .......... 116/332
3,522,534 3/1970 MacKenzie .......... 116/330
4,207,581 6/1980 Pelensky et al. .......... 116/331
4,218,726 8/1980 Fukasawa et al. .......... 362/32
4,300,470 11/1981 Furukawa .......... 116/332
4,380,043 4/1983 Takamatsu et al. .......... 362/26
4,625,262 11/1986 Sakakibara et al. .......... 362/32

FOREIGN PATENT DOCUMENTS 1251543 10/1967 Fed. Rep. of Germany ...... 116/328
3201571 7/1983 Fed. Rep. of Germany .
3343861 6/1985 Fed. Rep. of Germany .
849518 11/1939 France .......... 116/332
1269198 6/1960 France .......... 116/332
7815623 5/1978 France .
559350 1/1974 Switzerland .......... 116/330
13953 of 1916 United Kingdom .......... 116/330

*Primary Examiner*—William A. Cuchlinski, Jr.
*Assistant Examiner*—Daniel G. Depumpo
*Attorney, Agent, or Firm*—Martin A. Farber

[57] ABSTRACT

In an indicating instrument, a channel (4) of light-opaque material is fastened on a cap (2) held on a pointer shaft (1), the channel being open towards the observer, a pointer (5) of light-conducting material being inserted into it. The pointer (5) has a detent projection (6) by which it is secured to the cap (2).

4 Claims, 2 Drawing Sheets

INDICATING INSTRUMENT

RELATED APPLICATION

This application is a continuation of our co-pending application Ser. No. 07/287,474 filed Dec. 19, 1988 now abandoned.

FIELD AND BACKGROUND OF THE INVENTION

The present invention relates to an indicating instrument having a transparent light-conducting pointer which is fastened on a cap of a pointer shaft.

Such indicating instruments are generally known.

Ordinarily in such indicating instruments the pointer is firmly attached to the pointer shaft and the cap placed on the pointer. This has the disadvantage that the pointer can be removed only with difficulty, which in unfavorable particularly when the pointer is to be replaced by one having a different color.

SUMMARY OF THE INVENTION

It is an object of the invention to develop an indicating instrument of the aforementioned type in such a manner that its pointer can be mounted and replaced particularly rapidly by another one.

According to the invention, the pointer (5) is inserted into the cap (2) from the front side of the cap and is fastened in it by a clip-type attachment (for instance a detent projection (6), detent surface (8)).

By this development, after the cap has been mounted the pointer can be easily inserted into it. Therefore subsequent replacement of the pointer is also readily possible.

One advantageous development of the invention consists therein that the pointer (5) is placed substantially over its entire length within a channel (4) of light-opaque material which reflects back to the pointer (5). Such a channel assures very high stability on the part of the pointer since it need not be light-transmitting and therefore may consist of a material which is selected exclusively with regard to its strength. This high stability is advantageous in particular for vehicles which are subject to strong vibrations, particularly diesel vehicles. Aside from this, the channel sees to it that the light can emerge from the pointer only in the direction towards the observer, so that there is no loss of light towards the side and the pointer lights up sufficiently even when a relatively weak source of light is used.

For mass production it is advantageous that the channel (4) be developed integral with the cap (2).

Alternatively, however, it is also possible for the channel (4) to be inserted into a groove on the front of the cap (2).

The channel can be held attached to the pointer in a simple manner by means of a detent projection on the pointer if, in accordance with another embodiment of the invention, the pointer (5) has at least one detent projection (6) which can be passed through an opening (7) of the channel and can lock with a detent surface (8) on the cap (2).

BRIEF DESCRIPTION OF THE DRAWINGS

With the above and other objects in view, the present invention will be understood in connection with the drawings, in which.

DETAILED DESCRIPTION OF THE PREFERRED EMBODIMENT

Figure 1:
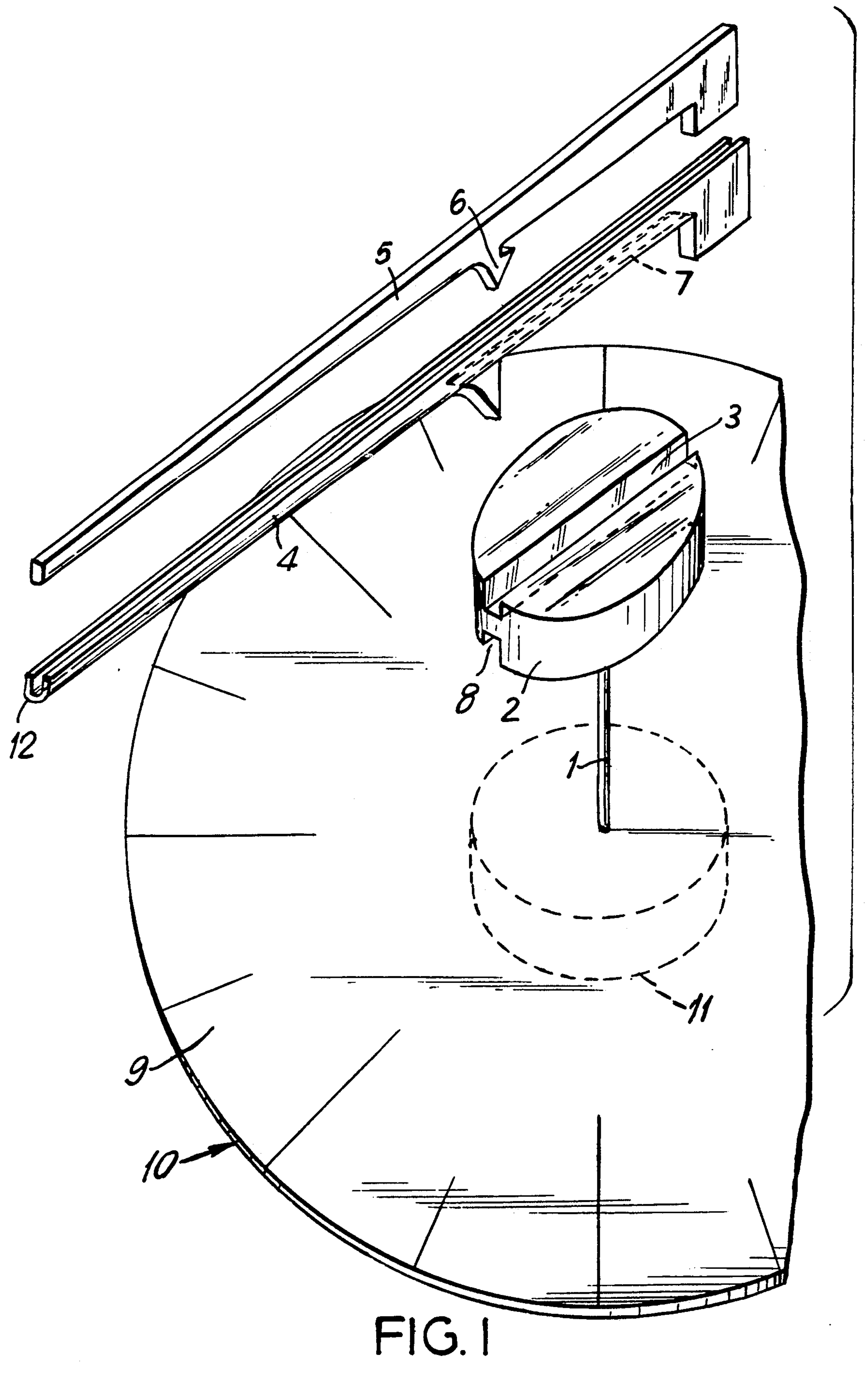
FIG. 1 is an exploded perspective view of a pointer and a cap in accordance with the invention.
Figure 2:
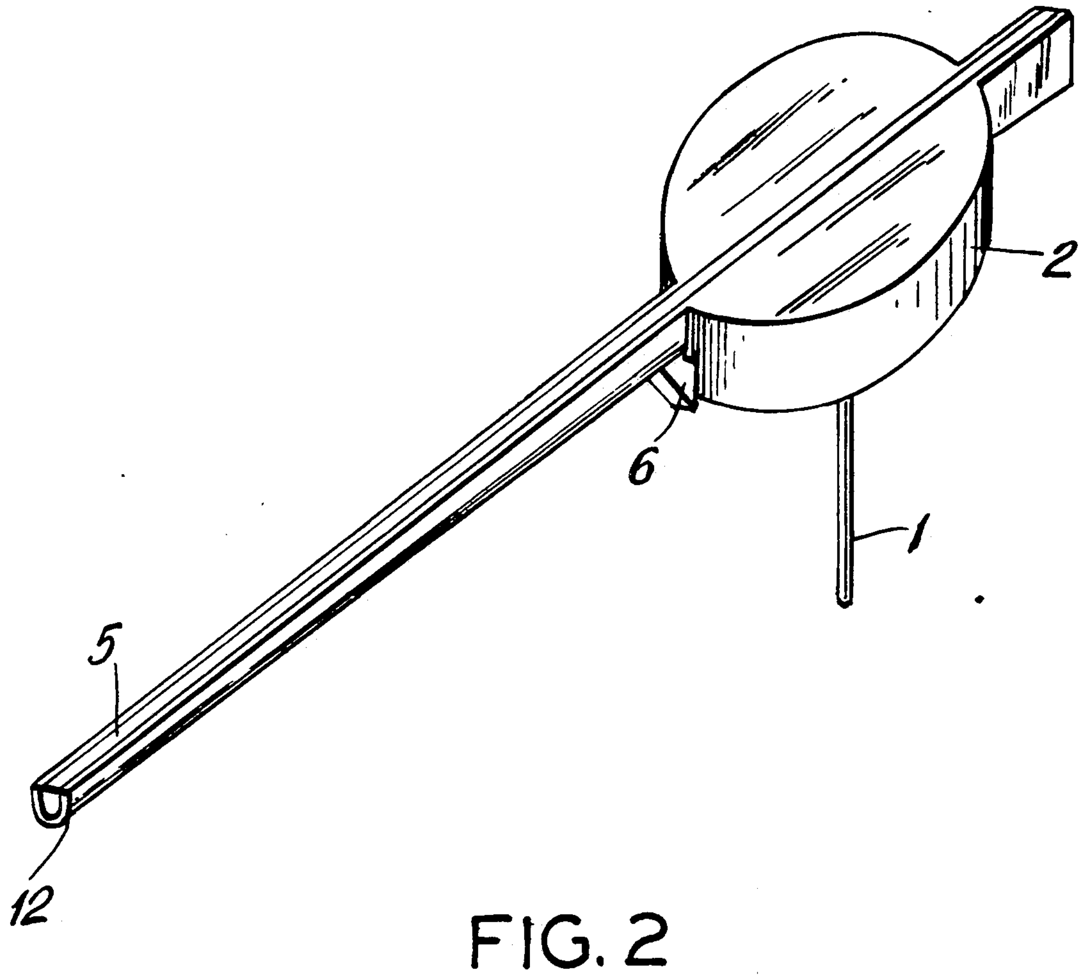
FIG. 2 is a perspective view of an integral formation of a pointer support and cap in an alternative embodiment of the indicator of FIG. 1.

The drawing shows a pointer shaft 1 on which a cap 2 is arranged, fixed for rotation. This cap 2 is provided in its upper face with a groove 3 which extends through its center and into which an elongated support 12 having a channel 4 can be inserted from above. This support with channel 4 consists of light-opaque, light-reflecting material and preferably is of a white color. A pointer 5 of transparent light-conducting material can be inserted from above into the channel 4. The pointer 5 has on its bottom a detent projection 6 which is capable of engaging through an opening 7 in the support of the channel 4 and, in assembled condition, grips below a detent surface 8 of the cap 2.

For the assembling of the display instrument, the pointer 5 is pushed from above into the channel 4 and this structural unit is then also placed from above into the groove 3. In this connection, the detent projection 6 engages with the detent surface 8 and in this way holds the pointer 5, and at the same time the support with channel 4, on the cap 2. The shaft 1 extends through a dial 9 of an indicator 18 to a mechanism 11 of the indicator 10. The mechanism 11 rotates the shaft 1 to position the pointer 5 in front of the dial 9.

I claim:

1. An indicating instrument comprising: a transparent elongated light-conducting pointer having a first end and a second end opposite said first end, the pointer having a detent projection located away from both ends of the pointer and extending outward of the pointer;
   a pointer shaft with a cap assembly thereon; and
   wherein said cap assembly comprises a cap portion and a support portion, the cap portion having a top surface and a bottom surface, said shaft extending from said bottom surface, said support portion extending radially outward from an axis of said shaft and along the top surface of said cap portion; and
   said support portion includes an elongated channel having a first end and a second end opposite said first end for receiving said pointer, there being an opening in said channel located away from both ends of the channel, the opening extending through said cap assembly from said channel to said bottom surface, said detent projection extending through said opening to engage with said bottom surface for locking said pointer in said channel.

2. An indicating instrument comprising
   a pointer and a pointer shaft, the shaft having a cap assembly thereon for receiving said pointer, an end of said pointer extending beyond said cap in a direction transverse to said shaft; and wherein
   said pointer connects with a top portion of said cap assembly, said shaft extending from a bottom portion of said cap assembly opposite said top portion; and
   said pointer comprises two leg means extending transversely from said pointer for connection with diametrically opposed locations on said cap assembly, one of said leg means being a detent projection having a terminus directed toward said shaft for gripping said bottom portion;

said cap assembly includes a channel unit located in said top portion, said channel unit being oriented transversely to said shaft for supporting said pointer, said channel unit having an opening for passage of said detent projection; and said detent projection passes through said opening for releasably securing said pointer to said cap assembly.

3. An instrument according to claim 2 wherein said channel unit extends the full length of said pointer, said pointer setting within a channel of said channel unit.

4. An instrument according to claim 3, further comprising a dial, said pointer being rotatable about said shaft and extending over said dial; and wherein said pointer is a transparent elongated light-conducting pointer.

* * * * *